United States Patent Office 2,729,606
Patented Jan. 3, 1956

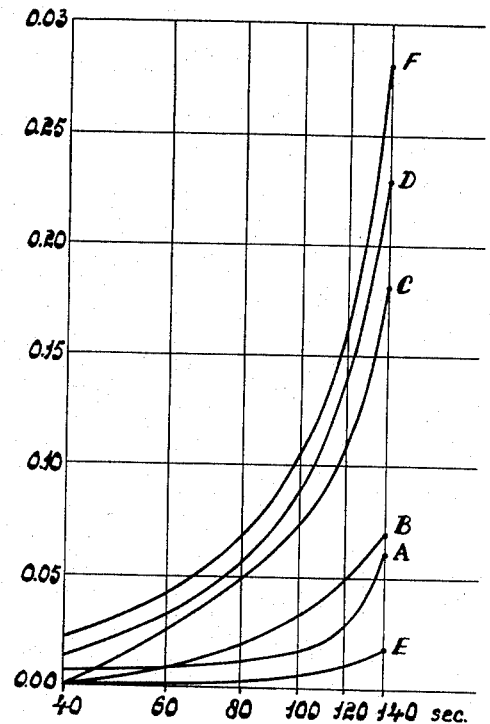

2,729,606

PREPARATION OF FLUORESCENT TUNGSTATE

Siegfried Rothschild, Wallington, England, assignor to Hartford National Bank and Trust Company, Hartford, Conn., as trustee Application August 26, 1952, Serial No. 306,463

Claims priority, application Great Britain August 28, 1951

3 Claims. (Cl. 252—301.5)

The invention relates to the preparation of fluorescent tungstates, in particular of a fluorescent tungstate suitable for the production of X-ray intensifying screens.

Hitherto, fluorescent tungstates have generally been prepared by firing a mixture of tungstic oxide with a metal oxide in particular oxides of bivalent metals such as Ca, Mg or Zn. It is rather difficult to achieve a uniform product with this method or to control grain size distribution. Various means have been proposed to achieve a more uniform material. In British patent specification 551,070 for instance, it is recommended to add sulphuric acid to a mixture of CaO and $WO_3$ before firing in order to promote the reaction and to ensure a more uniform product.

The afterglow of a fluorescent tungstate powder is found to vary with the method of preparation and, in general, the use of a flux with the firing mixture leads to a longer afterglow.

According to the present invention, the fired tungstate, after washing with a solvent for the flux to remove residual flux, is mixed with an alkali sulphate, preferably ammonium sulphate, to reduce afterglow and is re-fired. In general the flux used in the firing of fluorescent tungstates is a halide salt, more particularly a chloride, so that washing with water removes the flux. If the alkali sulphate is added together with the flux, then the chloride is decomposed by the action of the alkali sulphate during the firing and fails to produce the required effects. The firing has for this reason to be carried out in at least two stages. In the first firing the fluxes are active, while in the second firing the alkali-sulphate acts to correct the afterglow of the material.

The refiring of the tungstate with a sulphate according to the present invention has other advantages which are of importance for the reduction of the costs involved in the purification of the raw materials. It is known that presence of certain impurities such as copper, nickel and iron, may increase the afterglow of tungstates. It has now been observed that the presence of comparatively high concentrations of such impurities can be tolerated, if the product is refired with ammonium sulphate. The afterglow is reduced to such a level that it does not interfere with the use of the material in general X-ray practice.

No definite explanation can be given to explain the action of the sulphate to suppress the afterglow. It may be assumed that "killer" centres are produced, but the nature of these centres is not known. The results of an X-ray structure analysis of a powder treated with ammonium sulphate show no free $WO_3$ or other materials and are in every respect similar to those not treated with sulphate and which show a strong afterglow. Chemical analysis shows a trace, not exceeding 0.02%, of calcium sulphate in the treated powder. Both powders show scheelite structure and identical spacing, to ±.001A accuracy.

While fluorescent tungstate materials in general exhibit the high photographic efficiency under X-ray excitation, which is a prerequisite for a satisfactory material for the production of X-ray intensifying screens, and materials treated in accordance with the invention exhibit a satisfactory afterglow characteristic, not all such materials exhibit the grain size distribution which is desirable for the preparation of emulsions as required for the production of X-ray screens and which moreover should be controllable to allow the manufacture of screens of various types, e. g. high definition screens as well as standard screens. According to the further feature of this invention, for the purpose of proper control of the grain size distribution, use is made as flux in the first firing of calcium chloride. With the use of $CaCl_2$ as flux, the firing temperature should lie between 750° C. and 1,100° C. and the firing time between 10 minutes and several hours. The grain size distribution is determined by the quantity of flux, the firing time and the firing temperature. Any further adjustment which is desired can be achieved after firing by milling and/or elutriation. As mentioned above, the use of a flux tends to increase the afterglow so the method according to the invention for killing afterglow is particularly valuable in the case of materials prepared with $CaCl_2$ as flux.

To provide a wholly satisfactory fluorescent tungstate material for X-ray screens, it is also desirable to achieve a highly uniform material throughout the batch. As mentioned above, difficulty is encountered in producing uniformity when the material is prepared by firing an oxide mixture, even when utilising the means which have been proposed for facilitating this result. According to a further feature of the invention, the tungstate is prepared by precipitation from solution. Thus, for example, calcium tungstate is prepared by adding sodium tungstate solution to calcium chloride solution. The precipitate is washed to remove sodium chloride, is mixed with a flux, preferably calcium chloride, and is fired. The fired material is subsequently refired in admixture with an alkali sulphate such as ammonium sulphate, for the reasons hereinbefore set forth.

The following experimental details in conjunction with the accompanying drawing density of blackening of a photographic film due to afterglow is plotted as ordinate against the duration of exposure to afterglow as abscissa, serve to illustrate the benefit of the afterglow killing treatment.

Calcium tungstate prepared by the precipitation process set out above was fired under different conditions to produce six different materials as follows:

(A) $CaWO_4$, no flux, fired at 750° for 20 min.
(B) $CaWO_4$, 6% $CaCl_2$, fired at 750° for 20 min.
(C) $CaWO_4$, 6% $CaCl_2$, fired at 900° for 20 min.
(D) $CaWO_4$, 6% $CaCl_2$, fired at 900° for 1 hr.
(E) $CaWO_4$, sample D refired with 2% ammonia sulphate at 950° C. for 30 min.
(F) $CaWO_4$, sample E refired with 1% $CaCO_3$ at 950° C. for 30 min.

X-ray intensifying screens were made with these six materials. The screens were exposed to X-ray radiation (2 mA., 80 kv., 18" distance) for a period of 30 seconds and immediately brought into contact with a photographic film as used in X-ray practice so that the afterglow of the screen caused blackening of the film. A series of experiments were performed with different exposure times and the graph shows the results obtained. In comparison with material A which was free from flux the results for material B demonstrate the increase in the afterglow resulting from the addition of flux. The results for material C show the manner in which the afterglow increases if the firing temperature is increased. If, in addition, the firing time is lengthened, the afterglow is still further increased as shown by the results obtained with material D. When, however, the material D is refired with ammonium sulphate, then the material E is obtained for which the afterglow is less than any of the other materials. Refiring material E with calcium carbonate results in material F for which the afterglow is stronger than for any of the other materials.

In the foregoing examples calcium tungstate has been taken as a typical example of a fluorescent tungstate. Although calcium tungstate is particularly suitable for X-ray intensifying screens, the invention is applicable to fluorescent tungstates generally and is not restricted to calcium tungstate.

What I claim is:

1. A method for making fluorescent tungstates, which comprises the steps of firing a material selected from the group consisting of calcium tungstate, magnesium tungstate and zinc tungstate with a water-soluble halide salt-flux material to produce a fluorescent tungstate, thereafter washing the fired tungstate with water to remove residual flux therefrom, mixing said fired tungstate with ammonium sulphate, and firing said mixture to reduce afterglow of the fluorescent tungstate.

2. A method as claimed in claim 1 in which the halide salt is calcium chloride.

3. A method for making fluorescent tungstates, which comprises the steps of adding sodium tungstate solution to a calcium chloride solution to thereby precipitate out calcium tungstate, firing said calcium tungstate with a calcium chloride flux at a temperature in the range of 750 to 110° C., thereafter washing the fired tungstate with water to remove residual flux therefrom, mixing said fired tungstate with ammonium sulphate, and firing said mixture to reduce afterglow of the fluorescent tungstate.

References Cited in the file of this patent

UNITED STATES PATENTS 1,648,510     Sheppard  ---------------  Nov. 8, 1928